(12) United States Patent
Hiatt

(10) Patent No.: US 9,725,915 B1
(45) Date of Patent: Aug. 8, 2017

(54) CONSTRUCTION SYSTEM

(71) Applicant: Harvey Hiatt, Divide, CO (US)

(72) Inventor: Harvey Hiatt, Divide, CO (US)

( * ) Notice: Subject to any disclaimer, the term of this patent is extended or adjusted under 35 U.S.C. 154(b) by 45 days.

(21) Appl. No.: 14/528,351

(22) Filed: Oct. 30, 2014

Related U.S. Application Data

(62) Division of application No. 13/160,422, filed on Jun. 14, 2011, now Pat. No. 8,899,900.

(60) Provisional application No. 61/354,669, filed on Jun. 14, 2010.

(51) Int. Cl.
E04G 21/14 (2006.01)
E04G 21/16 (2006.01)

(52) U.S. Cl.
CPC .................. E04G 21/167 (2013.01)

(58) Field of Classification Search
CPC ... B66B 9/187; B66B 9/16; B66B 7/04; Y10S 187/90; B66F 9/02; B66F 9/06
USPC ............. 187/240, 242, 244, 245, 409, 900; 254/329, 332, 334, 338; 414/10–12; 52/127.2
See application file for complete search history.

(56) References Cited

U.S. PATENT DOCUMENTS

| | | | |
|---|---|---|---|
| 2,526,071 A * | 10/1950 | Estey ...................... | B66B 9/187 187/241 |
| 2,531,346 A * | 11/1950 | Schuchert ............... | B66B 9/187 187/239 |
| 2,560,499 A * | 7/1951 | Warry ...................... | B66B 9/16 187/243 |
| 2,586,464 A * | 2/1952 | Hicks ....................... | B66B 7/04 187/409 |
| 2,621,820 A * | 12/1952 | O'Sullivan ............. | B66B 9/187 187/900 |
| 2,652,164 A | 9/1953 | Tipps | |
| 3,765,550 A | 10/1973 | Tausheck | |
| 3,951,236 A * | 4/1976 | Schreiber ................ | B66B 9/187 182/145 |
| 4,007,573 A | 2/1977 | Gilb | |
| 4,071,115 A * | 1/1978 | Garcia ..................... | B66B 9/16 187/243 |
| 4,420,921 A | 12/1983 | Hardin | |
| 4,442,922 A * | 4/1984 | Johannson .............. | B66F 9/186 182/62.5 |
| 5,064,336 A | 11/1991 | Godbersen | |
| 5,584,363 A * | 12/1996 | Curtin ................. | B66F 9/07559 187/232 |
| 6,230,466 B1 | 5/2001 | Pryor | |
| 6,390,450 B1 * | 5/2002 | Bressner .................. | B66F 9/06 254/17 |
| 7,448,598 B1 * | 11/2008 | Elmlinger ............... | B66D 1/28 254/338 |
| D583,425 S * | 12/2008 | Kushner .................. | D21/686 |
| 7,681,691 B1 | 3/2010 | Miller | |
| 2005/0019096 A1 | 1/2005 | Prange | |
| 2009/0045015 A1 | 2/2009 | Anstead et al. | |

* cited by examiner

Primary Examiner — Gregory Adams
(74) Attorney, Agent, or Firm — Dietze and Davis, P.C.; Glenn H. Lenzen

(57) ABSTRACT

A construction system for building a home independently is provided that assists a sole home builder so that a modern home can be built without the use of heavy machinery or reliance on professionals.

13 Claims, 19 Drawing Sheets

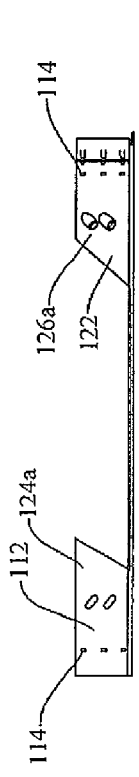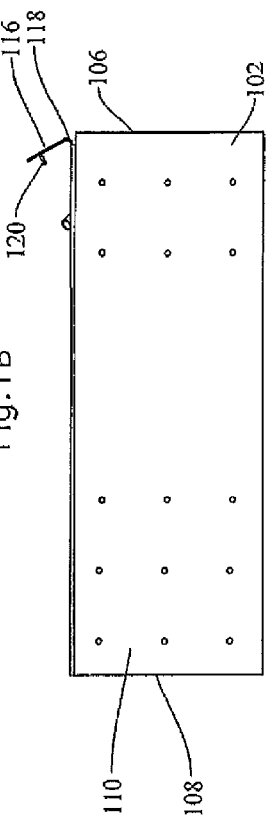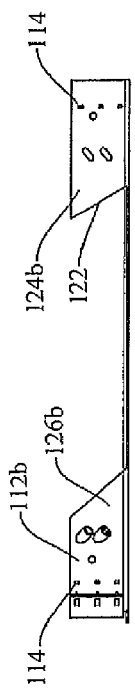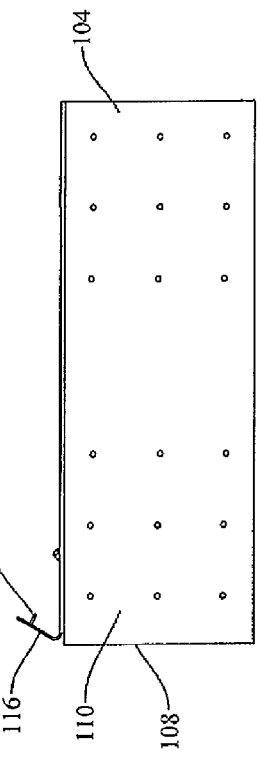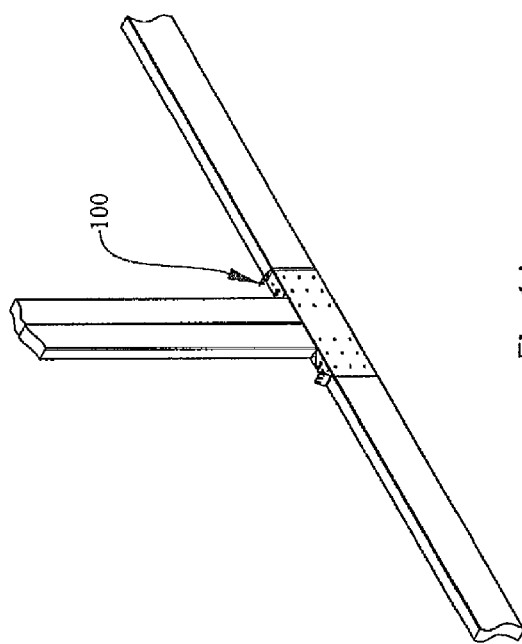

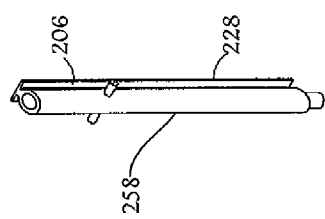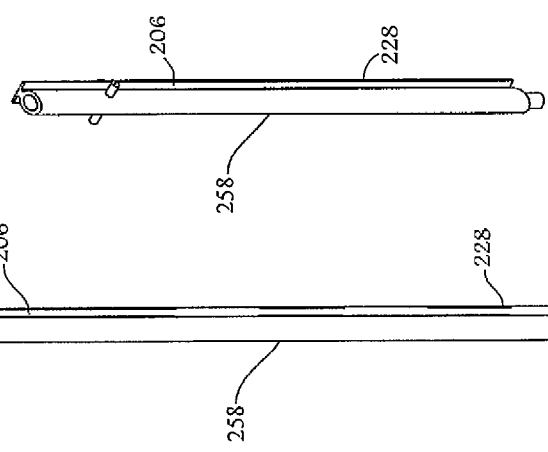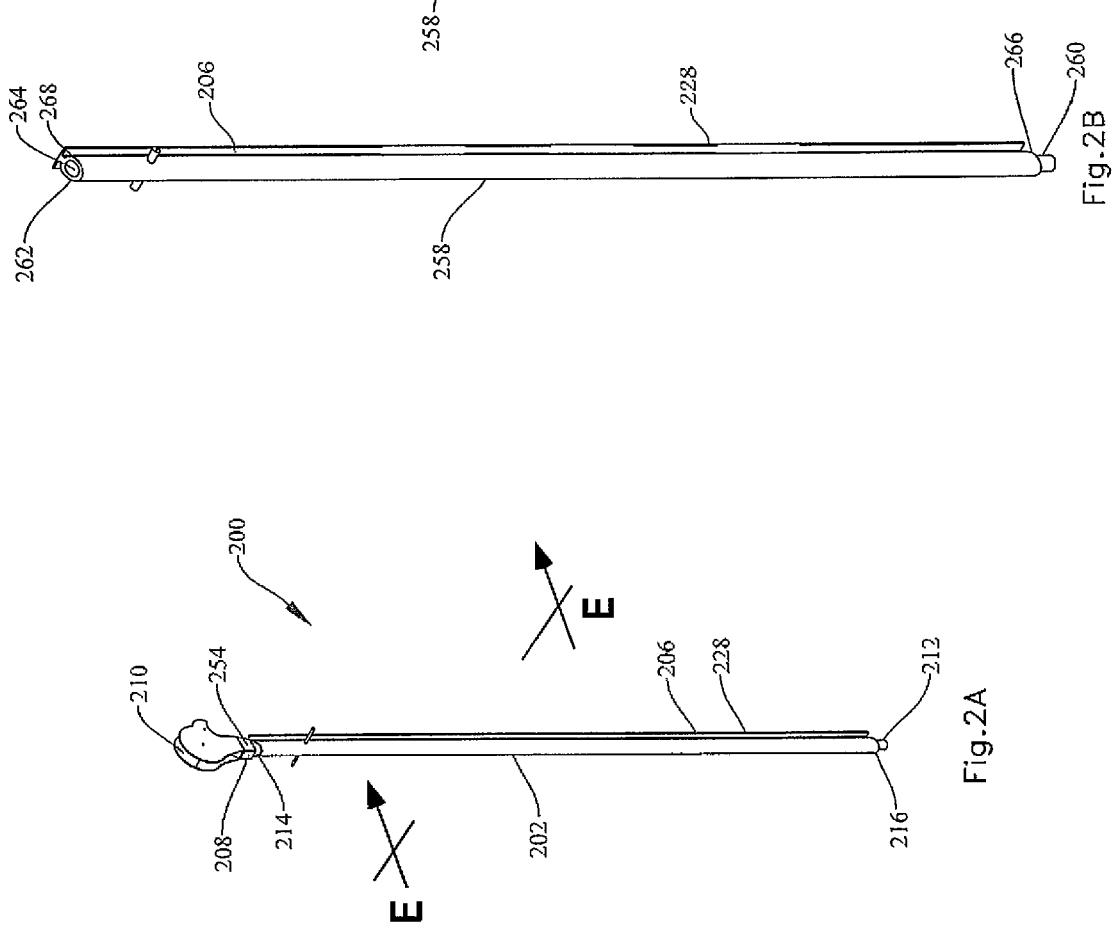

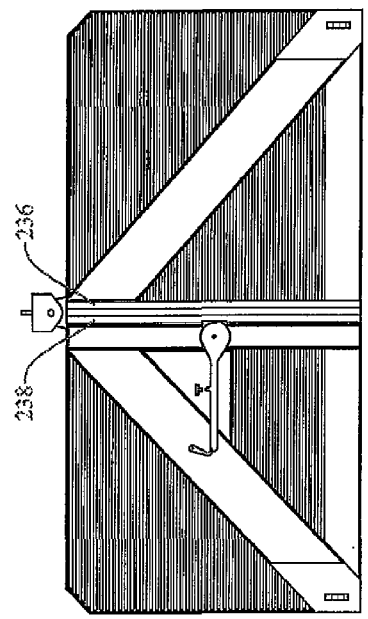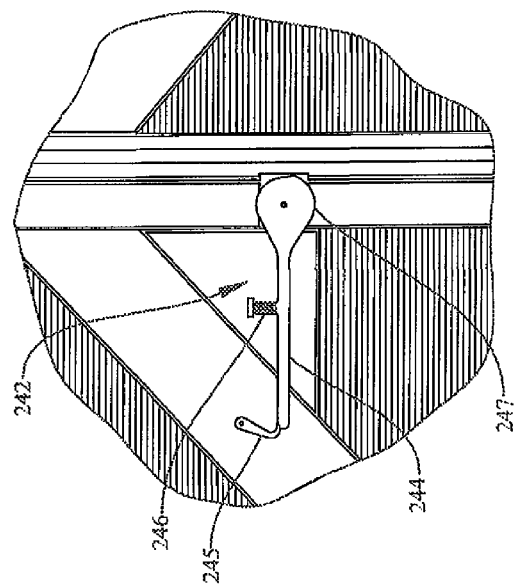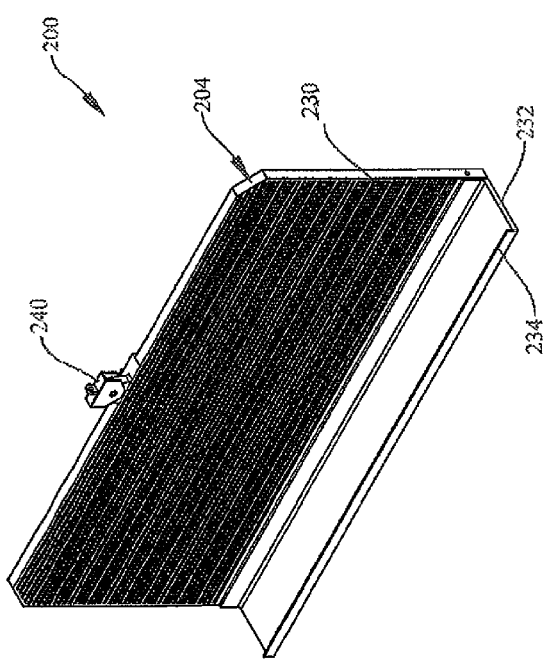

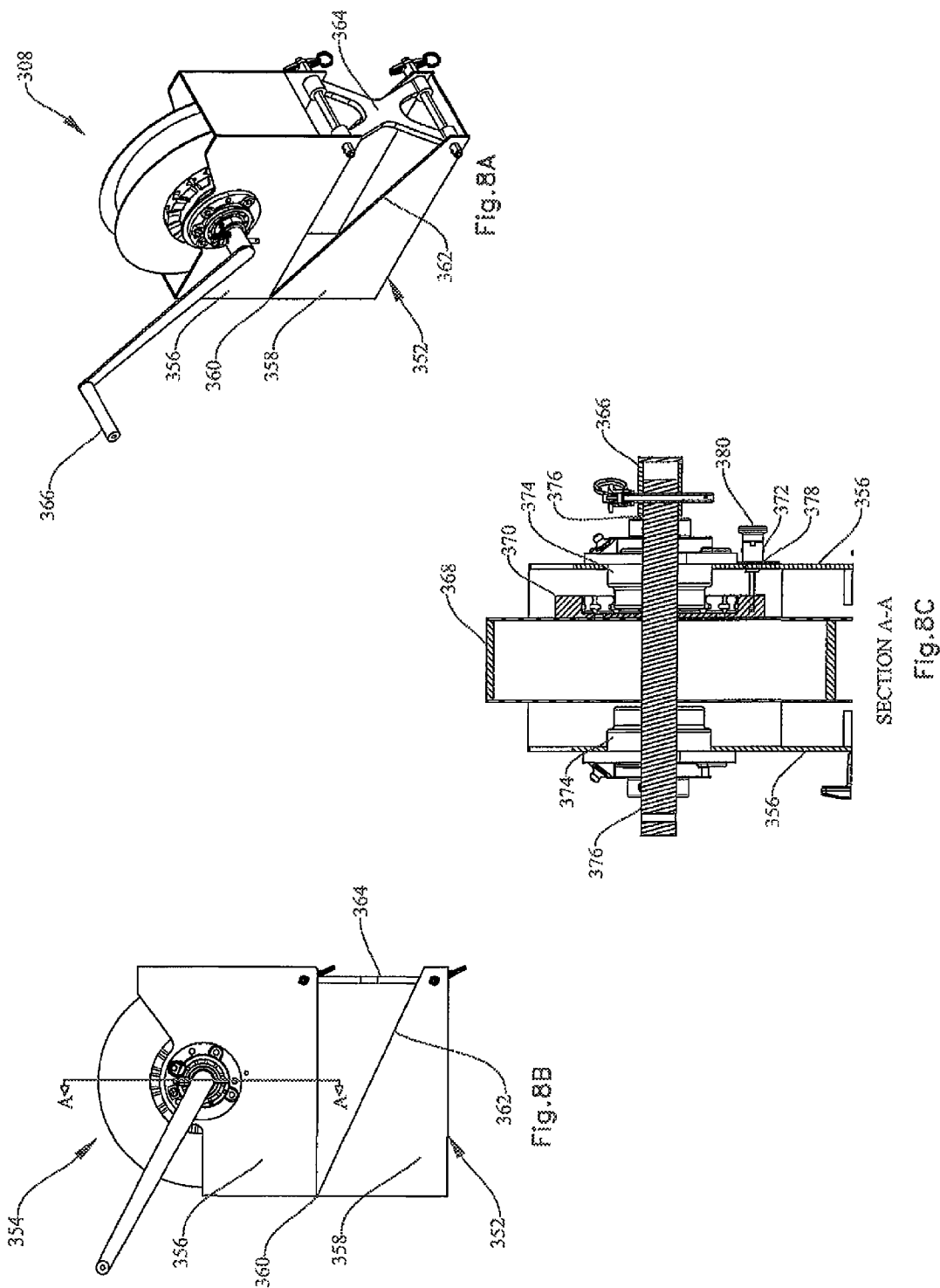

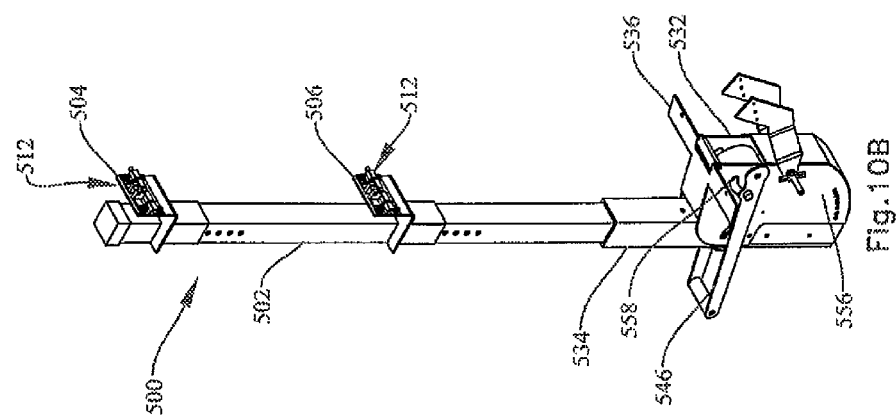
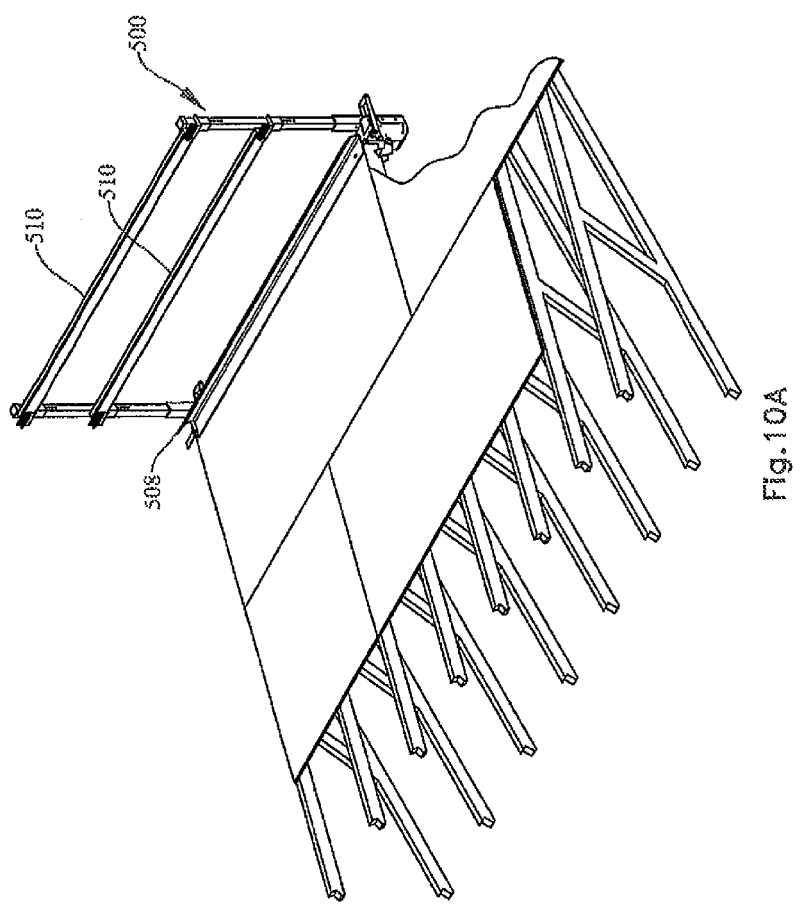

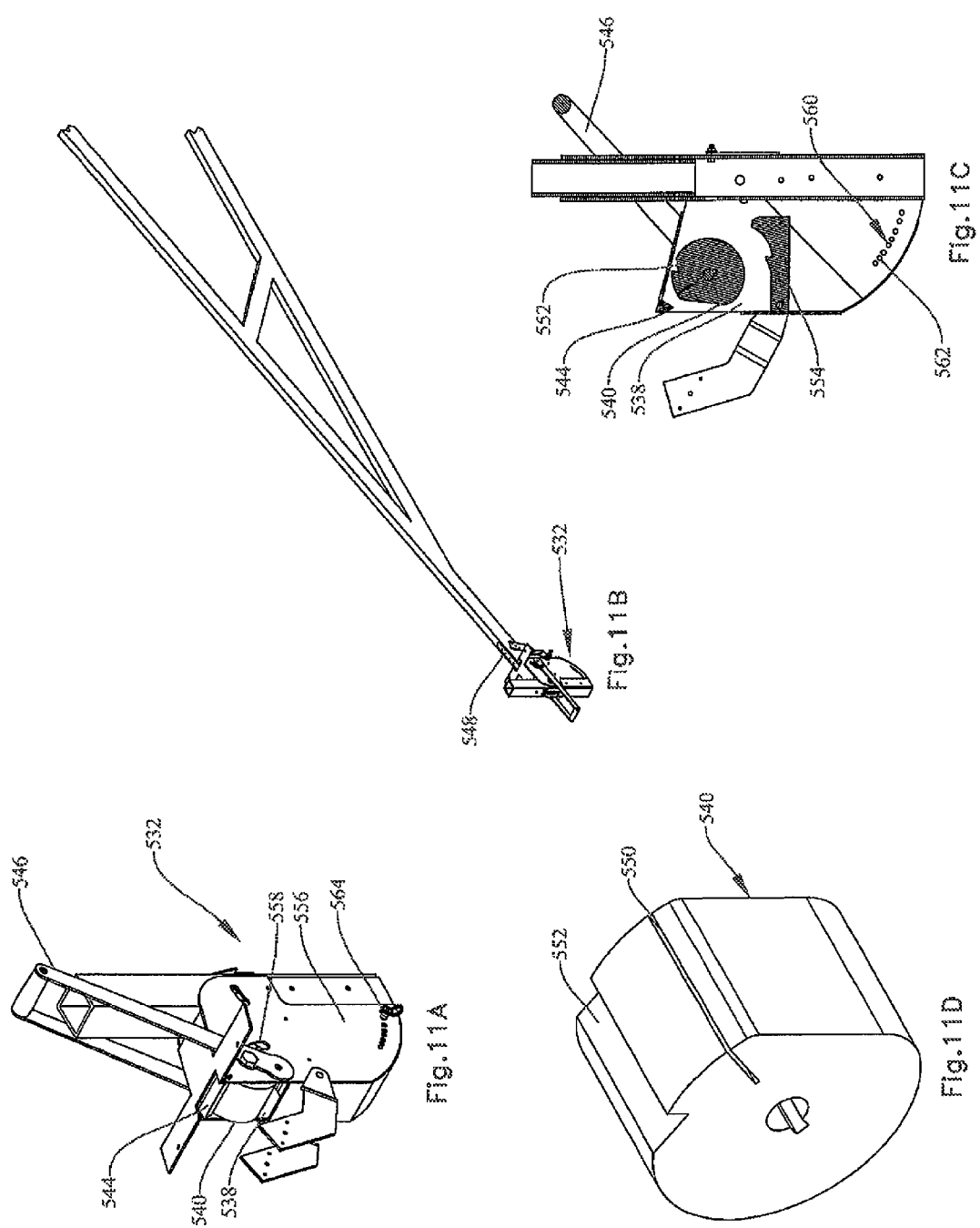

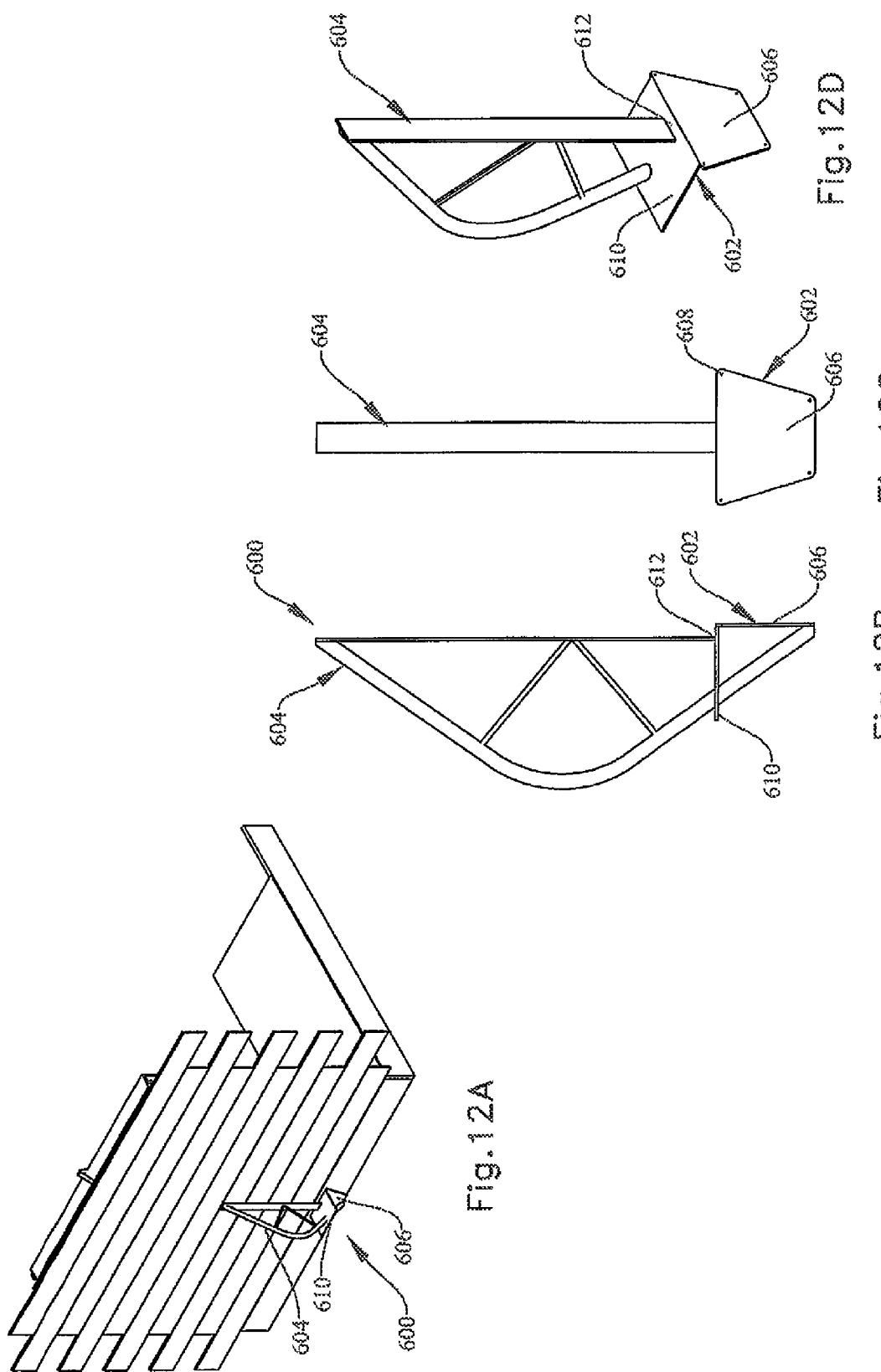

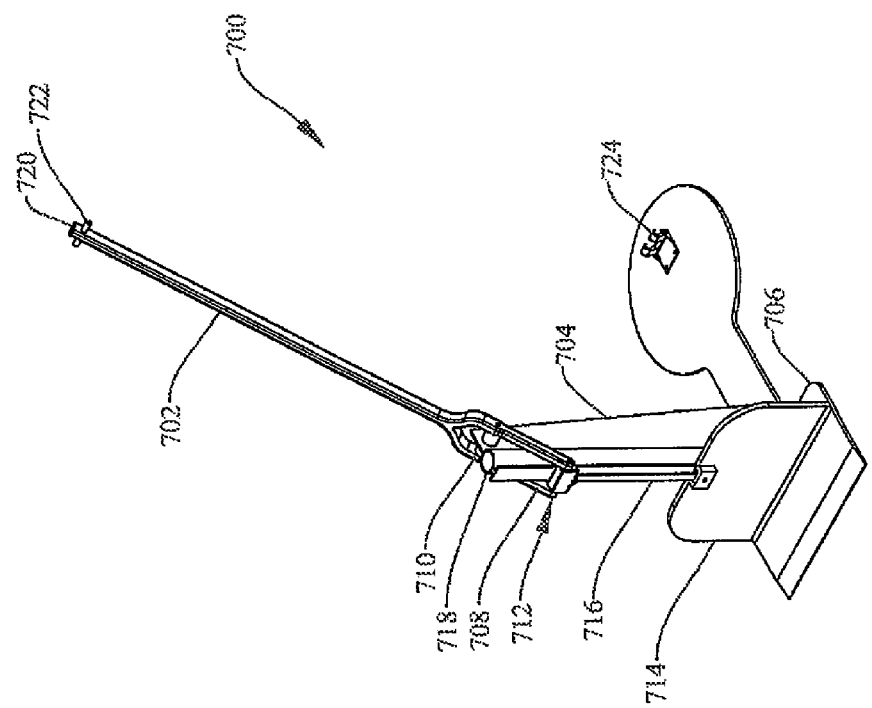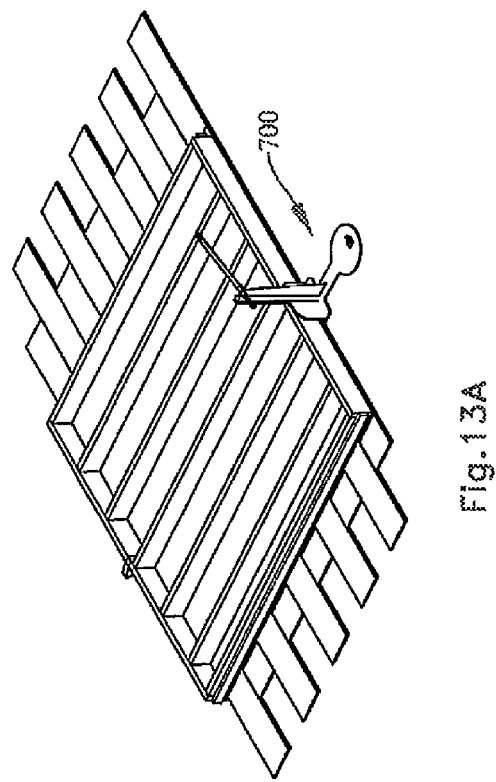

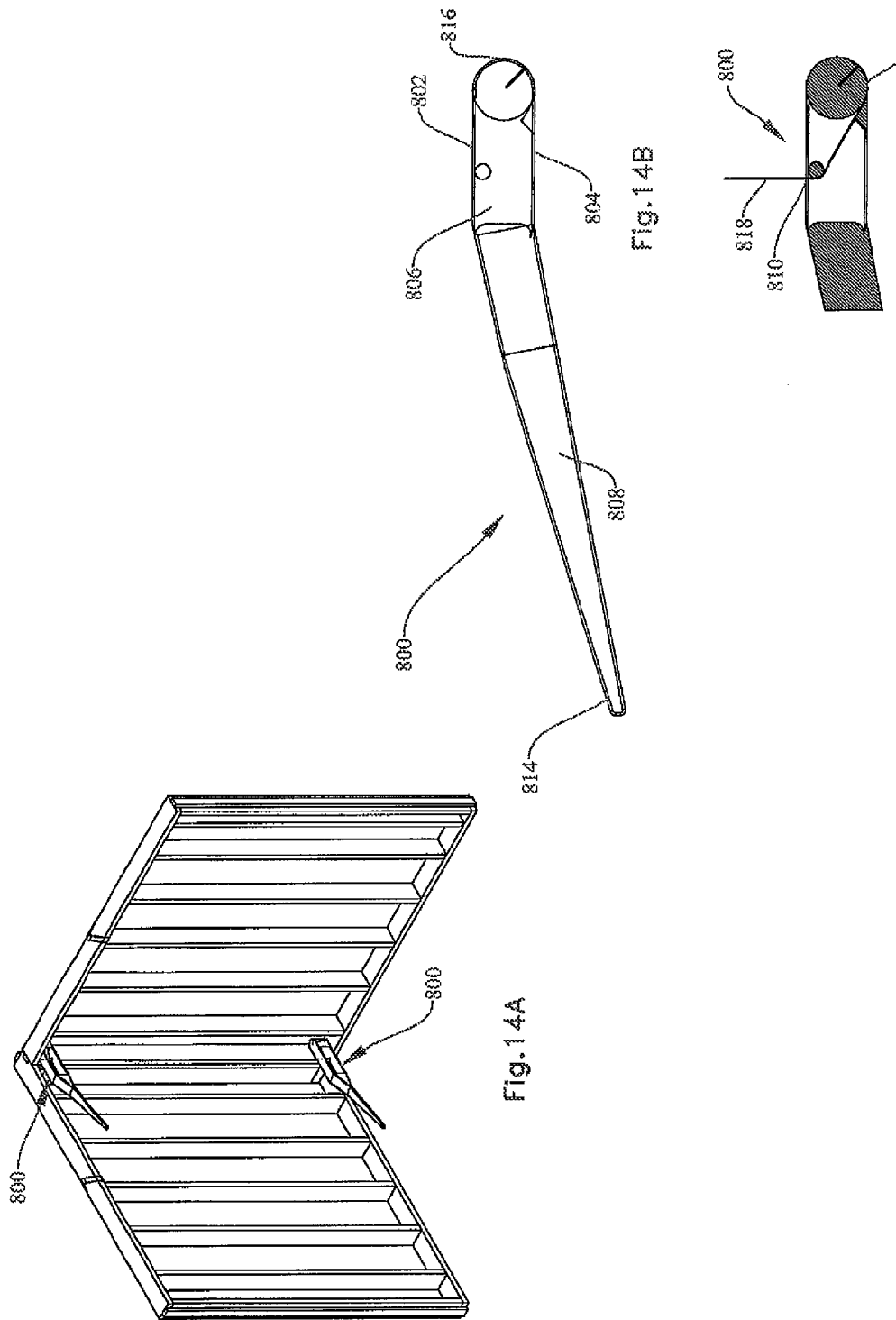

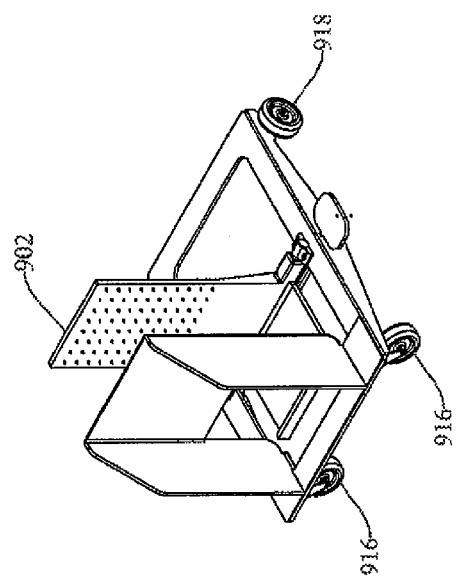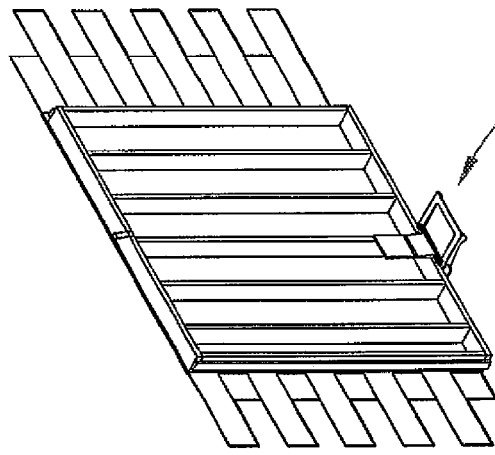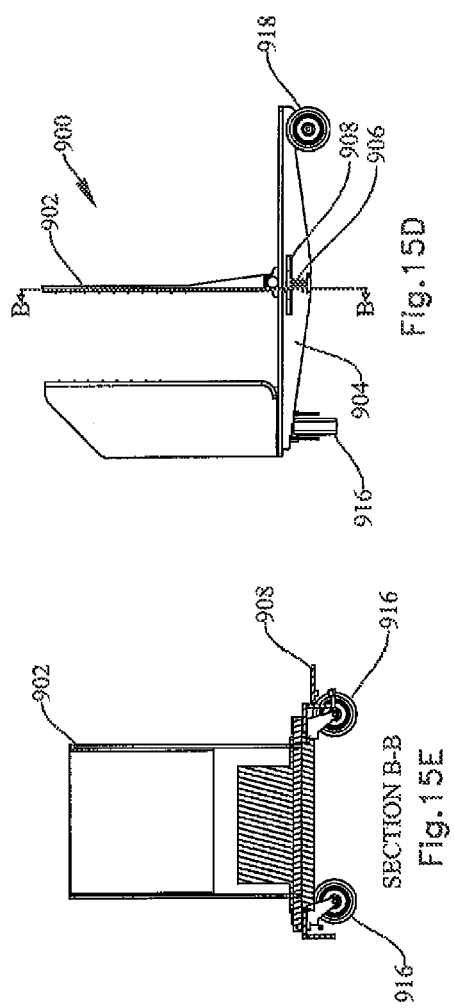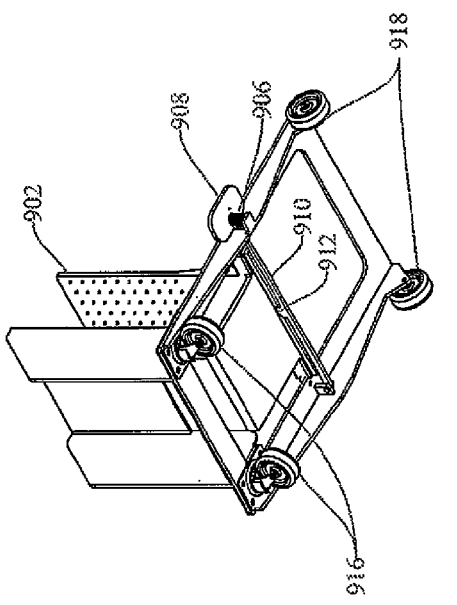

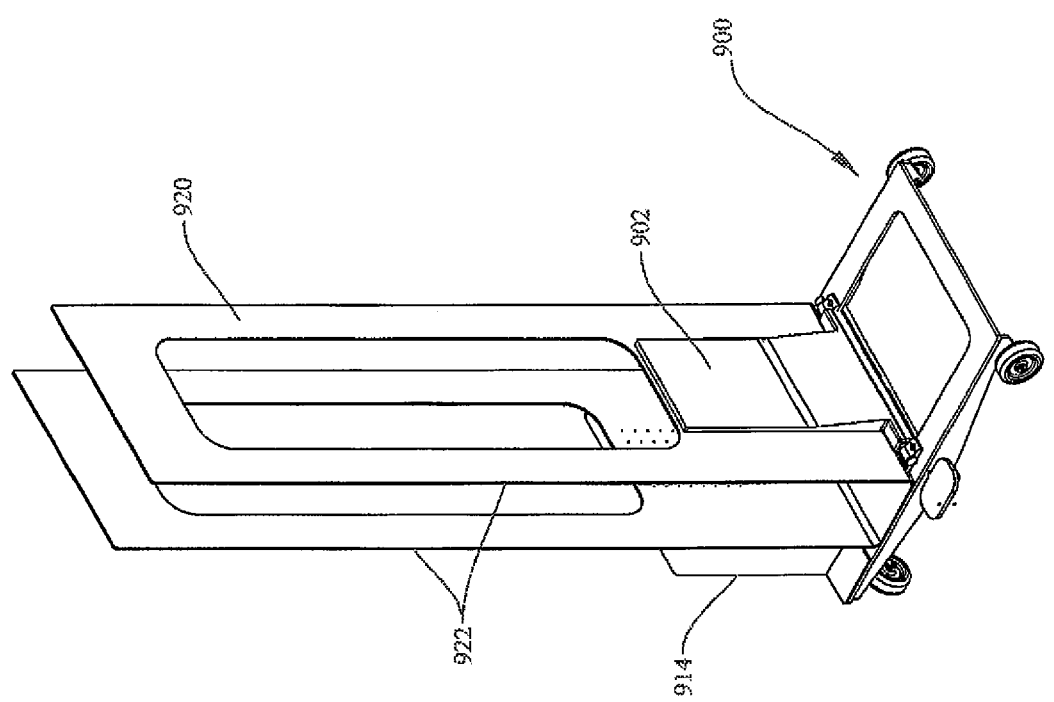

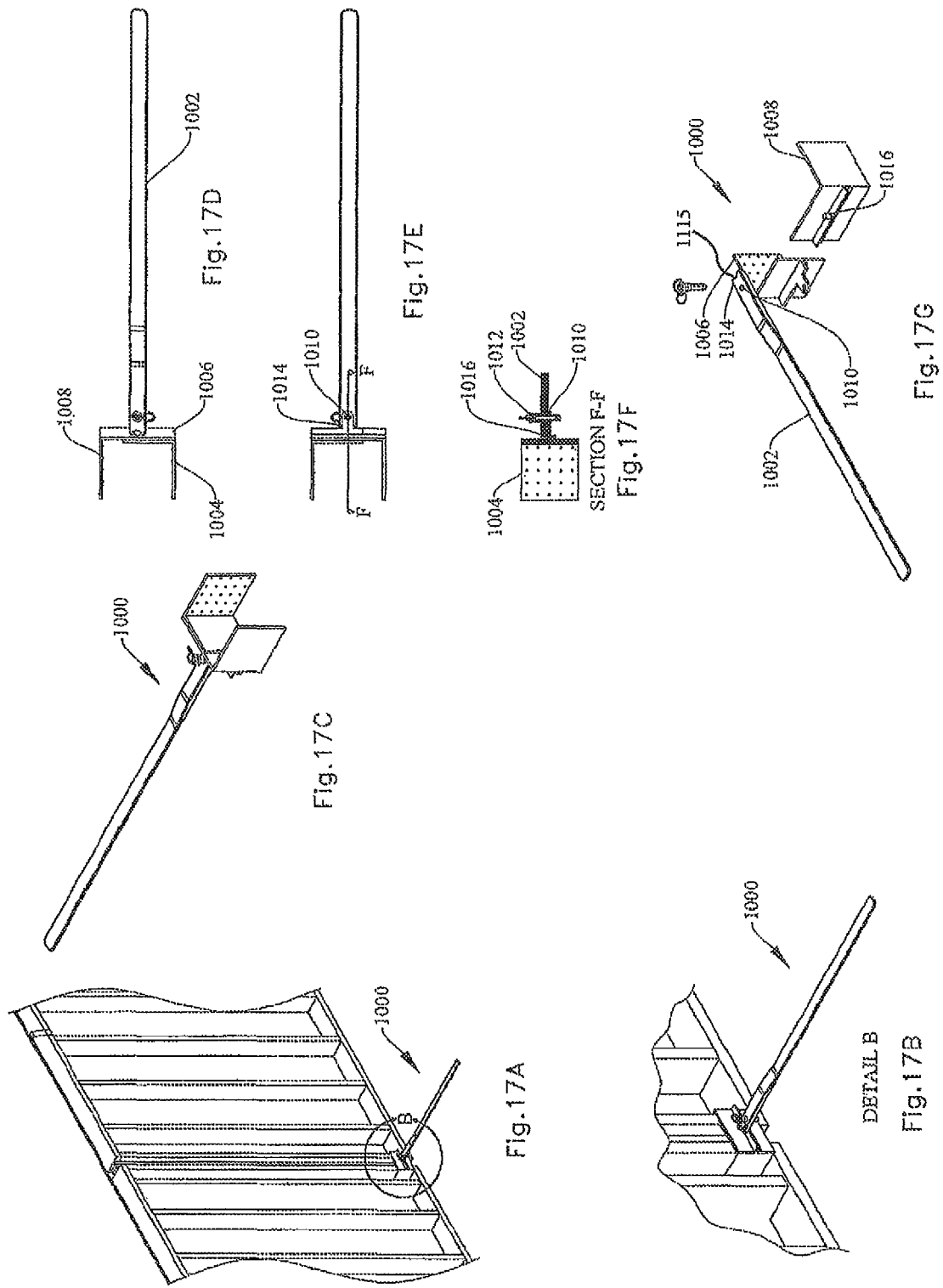

CONSTRUCTION SYSTEM

CROSS-REFERENCE TO RELATED APPLICATIONS

This application claims priority to U.S. Utility application Ser. No. 13/160,422, filed Jun. 14, 2011, which claims priority to and the benefit of U.S. Provisional Patent Application No. 61/354,669, filed on Jun. 14, 2010. The entire disclosures of U.S. Utility application Ser. No. 13/160,422 and U.S. Provisional Patent Application No. 61/354,669 are hereby incorporated herein by reference.

BACKGROUND OF THE INVENTION

Field of the Invention

The present invention generally relates to a construction system. More specifically, the present invention relates to a construction system for building a home independently.

Background Information

Whether for recreation or necessity, accomplishing projects with little or no help from professionals, known as do-it-yourself projects, continues to be popular. These do-it-yourself projects can extend to the necessities of life such as shelter, for example. Do-it-yourself shelters are not usually modern homes and are often primitive. Even if the knowledgeable builder could construct her own home, it is very time consuming to do so with limited help and no heavy machinery. Thus, building a modern home by oneself with little or no help from professionals is considered daunting or viewed as impossible. Even if the modern home is delivered in modules to limit on-site construction steps, lifting of heavy modules and steadying the heavy modules while installed are considered impossible tasks for less than a few men with no heavy machinery. Nevertheless, because of a continuing popular desire for independence and self-sufficiency, there is a need for a construction system that assists the independent building of a modern home.

In view of the above, it will be apparent to those skilled in the art from this disclosure that there exists a need for an improved construction system that assists independent home building. This invention addresses this need in the art as well as other needs, which will become apparent to those skilled in the art from this disclosure.

SUMMARY OF THE INVENTION

A construction system for building a home independently is provided that assists a sole home builder so that a modern home can be built without the use of heavy machinery or reliance on professionals.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 1A is a perspective view of a truss clip system;

FIG. 1B is a top view of a first shell of the truss clip system;

FIG. 1C is a side view of the first shell of the truss clip system;

FIG. 1D is a top view of a second shell of the truss clip system;

FIG. 1E is a side view of the second shell of the truss clip system;

FIG. 2A is a perspective view of a lift assist assembly;

FIGS. 2B, 2C and 2D are perspective views of extension bars of varying size;

FIG. 4A is a perspective view of the lift component of the lift assist assembly;

FIG. 4B is a back view of the lift component;

FIG. 4C is a magnified view of a lock mechanism of the lift component;

FIG. 8A is a perspective view of a ratchet assembly of the lift assist device;

FIG. 8B is a side view of the ratchet assembly of FIG. 8A;

FIG. 8C is a partial cross-section view of the ratchet assembly taken along line A-A of FIG. 8B;

FIG. 10A is a perspective view of a plurality of safety railing assemblies used on an unfinished roof;

FIG. 10B is a perspective view of the safety railing assembly

FIG. 11A is a perspective view of a base assembly of the safety railing assembly;

FIG. 11B is a perspective view of the base assembly in use on an unfinished roof;

FIG. 11C is a partial cross section view of the base assembly;

FIG. 11D is a perspective view of a cam apparatus of the base assembly;

FIG. 12A is a perspective view of a wall stop in use with a wall at an upper level of a home;

FIG. 12B is a side view of the wall stop;

FIG. 12C is a front view of the wall stop;

FIG. 12D is a perspective view of the wall stop;

FIG. 13A is a rear perspective view of a wall lift in use with a wall to be lifted;

FIG. 13B is a perspective view of the wall lift;

FIG. 14A is a perspective view of multiple corner draw breaker bars in use with walls forming a corner;

FIG. 14B is a side view of the corner draw breaker bar;

FIG. 14C is a partial cross section view of the corner draw breaker bar of FIG. 14B;

FIG. 15A is a rear perspective view of a cart in use with a wall;

FIG. 15B is a perspective view of the cart;

FIG. 15C is a bottom perspective view of the cart;

FIG. 15D is a side view of the cart;

FIG. 15E is a partial cross section of the cart taken along line B-B in FIG. 15D;

FIG. 16 is a perspective view of the cart in FIGS. 15A-15E with an adapter;

FIG. 17A is a rear perspective view of a wall splice base clamp in use with two walls for mating together;

FIG. 17B is a magnified view of a portion of FIG. 17A;

FIG. 17C is a perspective view of the wall splice base clamp;

FIG. 17D is a top view of the wall splice base clamp;

FIG. 17E is a bottom view of the wall splice base clamp;

FIG. 17F is a partial cross section view of the wall splice base clamp taken along line F-F of FIG. 17E; and FIG. 17G is an exploded view of the wall splice base clamp.

DETAILED DESCRIPTION

Figure 2E:
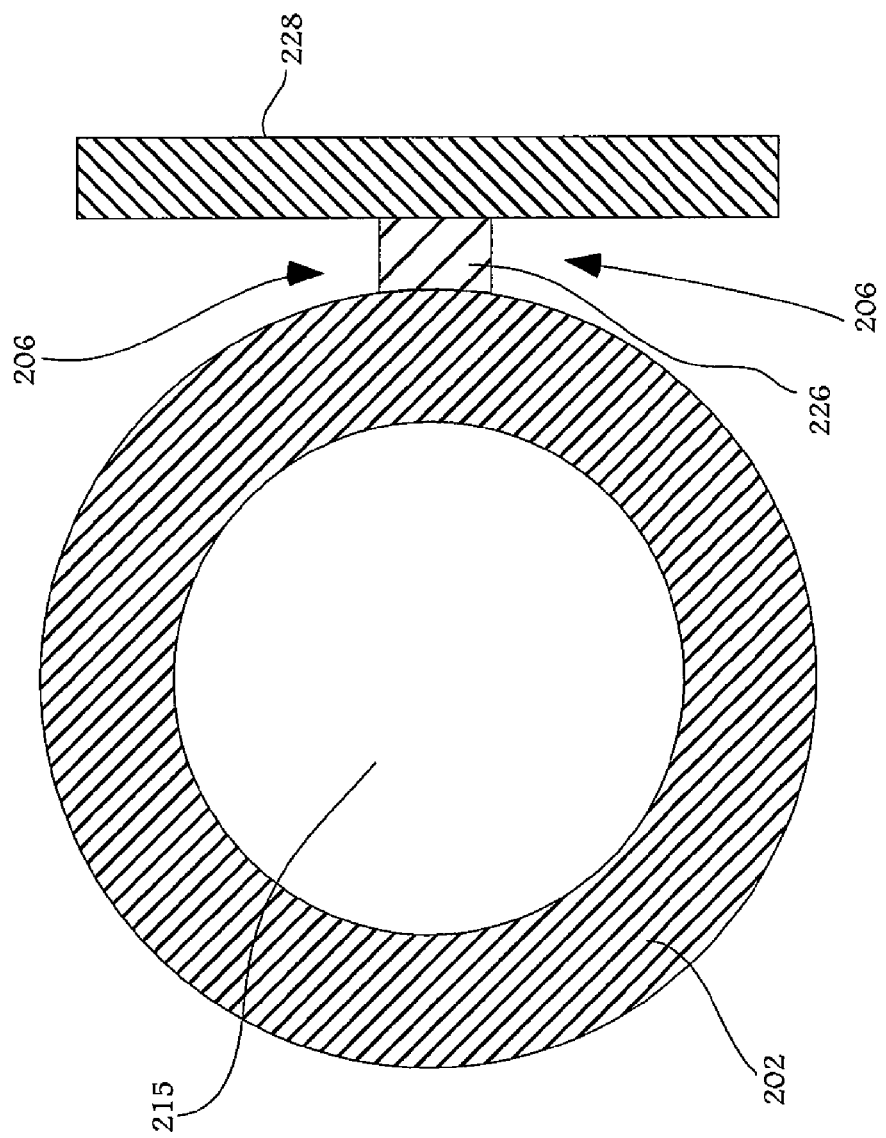
FIG. 2E is a cross-sectional view of the lift assist assembly taken along line E-E of FIG. 2A.
Figure 3B:
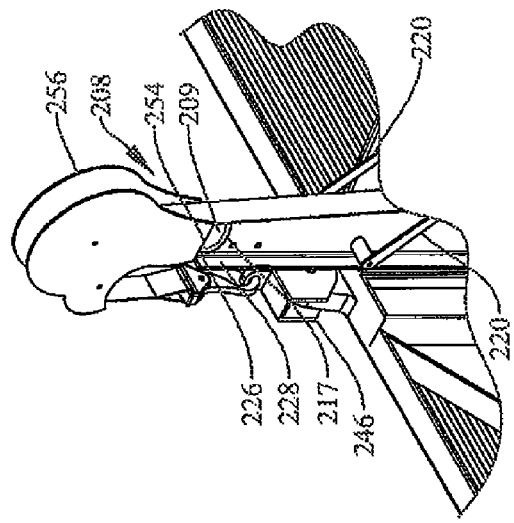
FIG. 3B is a magnified perspective view of a top portion of the lift assist assembly and the lift component.
Figure 3A:
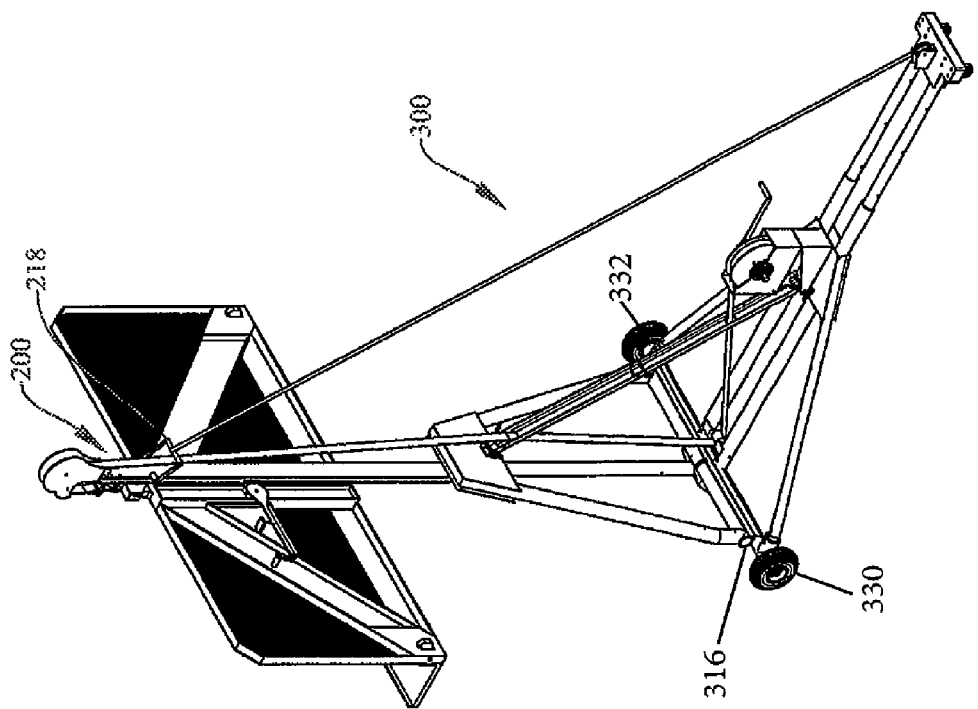
FIG. 3A is a perspective view of the lift assist assembly, having a lift component, and a lift assist device.

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Components of a construction system will now be described with reference to the Figures. Referring initially to FIGS. 1A-1E, a truss clip system 100 is illustrated in accordance with a first embodiment of the present invention. The truss clip system 100 aligns a vertical beam that needs to be connected to a horizontal beam at a specific location on the horizontal beam. The truss clip system 100 also ensures perpendicularity of the vertical beam with the horizontal beam. The truss clip system 100 includes a first shell 102 and a second shell 104 which are disposed on sides of the horizontal and vertical beams. The first shell 102 has a first end 106 and a second end 108 opposite the first end 106. The first shell 102 is bent at an angle to form a lateral beam guide 110 and an upper beam guide 112. The lateral beam guide 110 is preferably disposed at a right angle to the upper beam guide 112 so as to be positioned on a side of a horizontal beam while the upper beam guide 112 is disposed on the connecting, perpendicular surface.

The upper beam guide 112 has a plurality of alignment apertures 114 on each end and a flap 116 with a flexible hinge 118 disposed on the first end 106. The flap 116 pivots about the flexible hinge 118 to selectively lie flat on the upper beam guide 112. The flap 116 has a plurality of alignment pegs 120 to facilitate alignment of and secure alignment of the alignment apertures 114. The alignment pegs 120 are preferably pointed and curved back towards the hinge 118. The alignment pegs 120 are disposed on an end of the flap 116 opposite the hinge 118. The upper beam guide 112 has a channel 122 that is sized and configured to receive vertical beams or supports and to guide the vertical beams. Sides of the channel 122 slope towards the lateral beam guide 110 and away from the flap 116 to form first and second wedge shape sections 124, 126 of the upper beam guide 112.

The second shell 104 is substantially the same as the first shell 102 except that the flap 116 is on an opposite side (second end 108) when compared with the first shell 102. The channel 122 slopes toward lateral beam guide 110 and away from the second end 108 (away from flap 116).

The shells 102, 104, when disposed on respective sides of the horizontal beam, are slidably coupled via the upper beam guides 112. Specifically, the first upper beam guide 112 slidably couples with the second upper beam guide 112b such that one substantially covers the other. More specifically, first wedge shape section 124a slidably couples with second wedge shape section 126b and second wedge shape section 126a couples with first wedge shape section 124b such that the alignment apertures 114 on each wedge shape section 124, 126 are in alignment to receive pegs 120. The shells 102, 104 guide the vertical beam to a perpendicular position with the lateral beam as they slidably couple. The channels 122 of each shell 102, 104 provide guidance to align the vertical beam with the horizontal beam and/or to guide to a particular location on the horizontal beam, or ensure perpendicularity of the vertical beam with the lateral beam.

Once in position, the shells 102, 104 are locked together in the desired location and orientation. The shells 102, 104 are locked by driving the pointed ends of the pegs 120 through the alignment apertures 114 of both shells 102, 104 on a respective end and into the horizontal beam. The pegs 120 are driven through the alignment apertures 114 and into the horizontal beam by applying downward pressure on the flap 116. The shells 102, 104 are preferably comprised of steel or other hard alloy, for example.

Lift Assist Assembly

Referring now to FIGS. 2A-3B, a lift assist assembly 200 in accordance with an embodiment of the present invention will now be explained. The lift assist assembly 200 aids a sole home builder in lifting construction loads that would be otherwise too heavy to lift alone. The lift assist assembly 200 also helps to lift a construction load higher than would otherwise be possible when lifting alone. For example, the lift assist assembly 200 can lift a pre-constructed wall or truss high above the sole home builder's head. The lift assist assembly 200 steadies the heavy construction load as it is lifted to a desired height e.g. to a roof or floor above in a multistory structure.

The lift assist assembly 200 includes a base bar 202, a lifting component 204, a guide track 206, a pulley bar 208 and one or more pulleys 210. The base bar 202 provides leverage to lift a heavy construction load by a sole home owner. The base bar 202 is preferably comprised of steel or other strong alloys and is sized and configured to be strong enough to resist bending during use of the pulley bar 208 and pulleys 210 at a top end of the base bar 202 to lift the heavy construction load. The base bar 202 has a connecting end portion 212 and a receiving end portion 214 opposite the connecting end portion 212. The connecting end portion 212 is directly connected to the base bar 202 and extends from the base bar 202 as a bar with a smaller size or diameter than the base bar 202.

The base bar 202 further includes a connecting face 216 at a location where the connecting end portion 212 extends out of the base bar 202. The connecting face 216 is formed by a difference in size between the smaller connecting end portion 212 extending out of the base bar 202. The connecting face 216 is not perpendicular to a longitudinal axis of the base bar 202. Instead, the connecting face 216 slopes down and away from the guide track 206. The receiving end portion 214 has an aperture 215 with a complementary size to receive a connecting end portion 209 of the pulley bar 208. The receiving end portion 214 has a receiving face 217 that slopes upwardly toward the guide track 206. The connecting face 216 and the receiving face 217 have complimentary orientations and, when installed correctly, the base bar 202 correctly fits with the pulley bar 208 when the connecting face 216 abuts the receiving face 217. This ensures that the bars 202 and 208 are connected properly and that the guide track 206 is properly aligned.

The lift assist assembly 200 further includes a cable guide 218 straddling the base bar 202. The cable guide 218 guides a cable used in conjunction with the pulleys 210. The cable guide 218 has arms 220 and a leader portion 222 linking the arms 220 together. The arms 220 are disposed on opposite sides of the base bar 202. The leader portion 222 has an aperture therethrough that the cable runs through during use. The aperture optionally has a bushing or roller bearings disposed therein to limit friction.

The guide track 206 is disposed on the base bar 202 to guide the lift component 204 along the base bar 202. The guide track 206 includes a spacer 226 and a guide panel 228 disposed on the spacer 226, which is connected to the base bar 202 and links the guide track 206 to the base bar 202, as is shown in greater detail in FIG. 2E. Both the guide panel 228 and the spacer 226 extend approximately the longitudinal length of the base bar 202. The spacer 226 is sized so as to space the guide panel 228 a distance from the base bar 202 to make room for and facilitate movement of the lift component 204 traveling up the base bar 202 along the guide track 206. The spacer 226 can be a thin bar or as simple as a welding bead between the guide panel 228 and the base bar 202. The spacer 226 connects at a center portion of the guide panel 228. The spacer 226 and the guide panel 228 constitute the guide track 206 for guiding a moving weight along the base bar 202.

The pulley bar 208 has a connecting end portion 254 configured to connect to the receiving end portion 214 of the base bar 202 or the receiving end portion of an extension bar, as will be described below. At the opposite end of the connecting end portion 254 are the pulleys 210 and pulley support structure 256 for connecting the pulleys 210 and supporting the pulleys 210 in use.

The lift assist assembly 200 further includes a plurality of extension bars 258. One or more of the extension bars 258 are optionally disposed between the base bar 202 and the pulley bar 208 to increase the length and leverage of the lift assist assembly 200. A sole home builder can therefore adjust the height of the lift assist assembly 200 using the extension bars 258 when the construction load requires more leverage for lifting or needs to be lifted to a height higher than the height obtainable with only the base bar 202 and the pulley bar 208.

The extension bar 258 includes a connecting end portion 260 and a receiving end portion 262 opposite the connecting end portion 260. The connecting end portion 260 is directly connected to the extension bar 258 and extends from the extension bar 258 as a bar with a smaller size than the extension bar 258. The receiving end portion 262 has an aperture 264 with a complementary size to receive the connecting end portion 254 from the pulley bar 208 or the connecting end portion 260 of another extension bar 258.

Specifically, the aperture 264 is sized and configured with inner dimensions to receive the entire connecting end portion 212, 258 therein. The extension bar 258 has a connecting face 266 at a location where the connecting end portion extends out of the extension bar, the connecting face 266 is formed by the difference in size between the smaller connecting end portion 260 and the larger extension bar 258. The connecting face 266 is not perpendicular to a longitudinal axis of the extension bar 258. Instead, the connecting face 266 slopes down and away from the guide track 206. The receiving end portion 262 has a receiving face 268 not perpendicular to the longitudinal axis of the extension bar 258. The receiving face 268 slopes upwardly and toward the guide track 206. The connecting face 266 and the receiving face 268 have complimentary orientations and, when installed correctly, the extension bar 258 fits on the base bar 202 correctly when the connecting face 266 abuts the receiving face 268. Thus, the lift assist assembly 200 has a built in mechanism for ensuring that the bars 202, 208, 258 are connected properly and that the guide track 206 is properly aligned from one bar to another. It will be apparent to one of ordinary skill in the art from this disclosure that the base bar 202, pulley bar 208 or extension bar 258, while shown as round bars in the Figures, can be of various shapes, e.g. square, oblong, etc.

Figure 5:
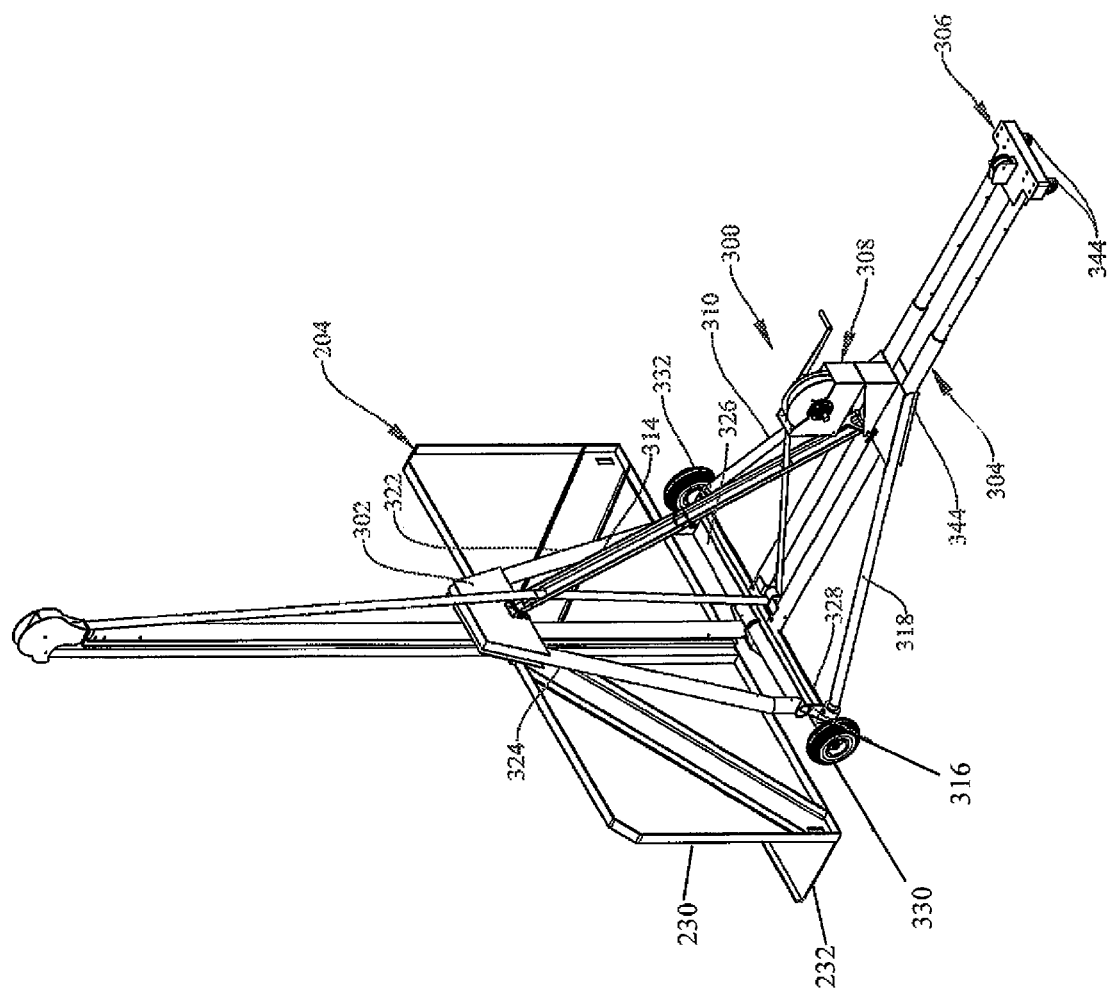
FIG. 5 is a perspective view of the lift assist assembly and the lift assist device.
Figure 6B:
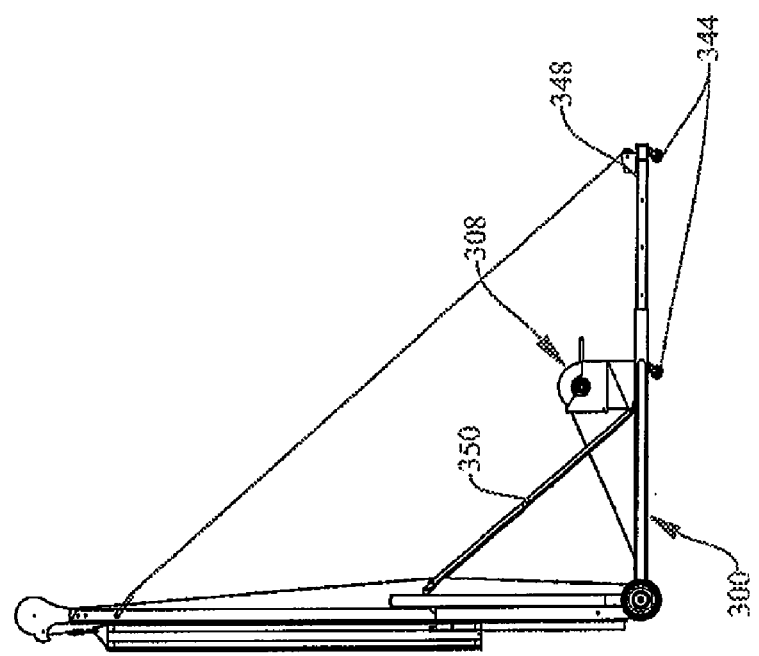
FIG. 6B is a side view of the lift assist assembly with lift component and the lift assist device of FIG. 6A.
Figure 6A:
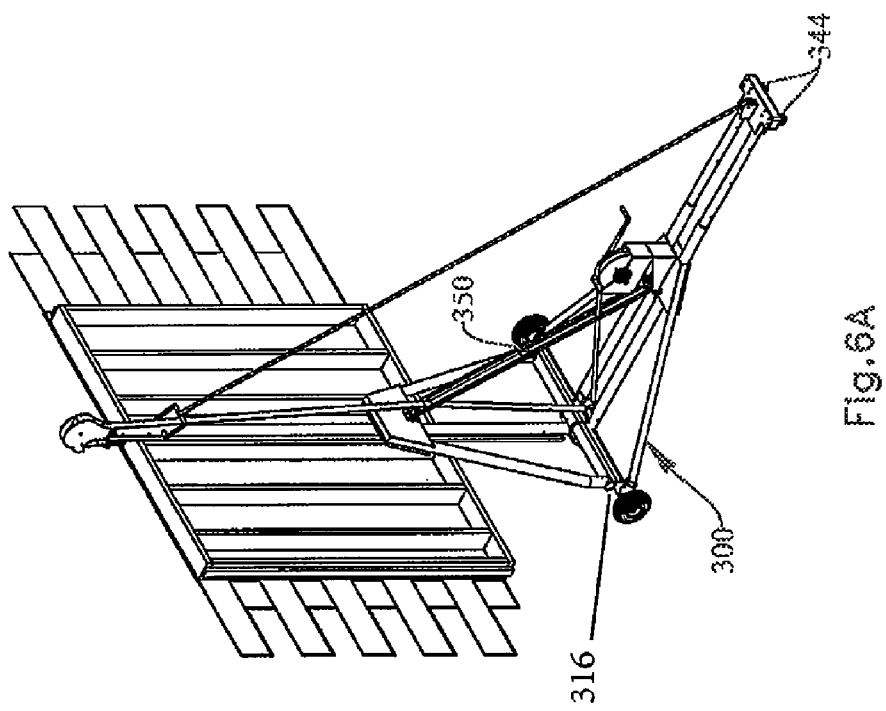
FIG. 6A is a perspective view of the lift assist assembly with another embodiment of the lift component and the lift assist device.
Figure 7:
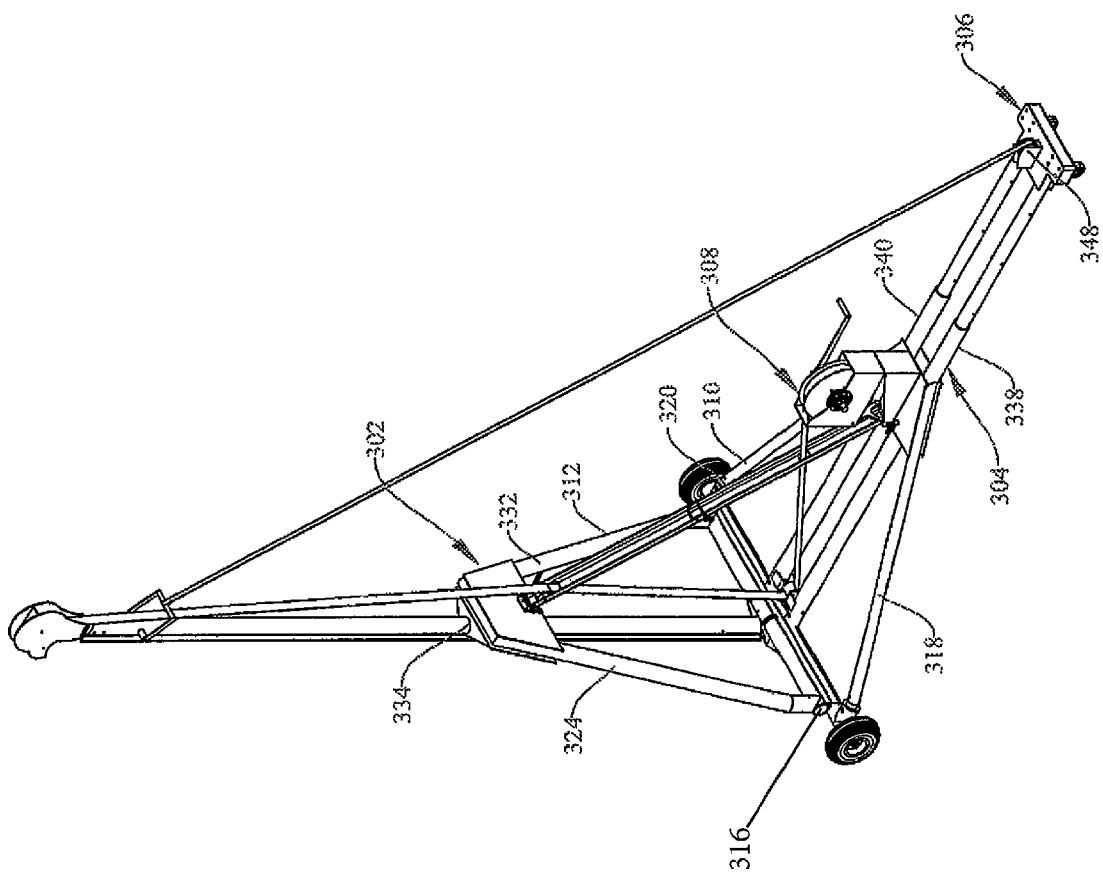
FIG. 7 is a perspective view of the lift assist device.
Figure 9A:
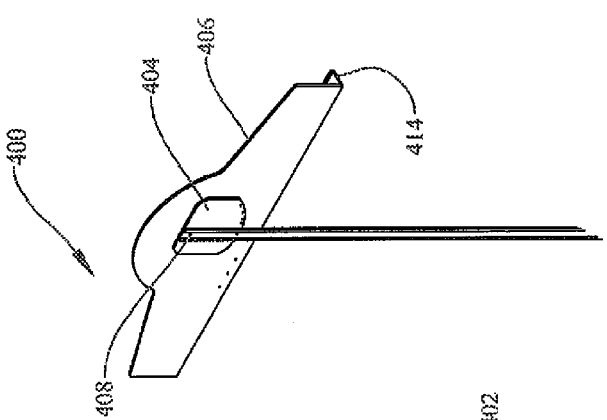
FIG. 9A is a rear perspective view of a gable bracket mechanism.
Figure 9B:
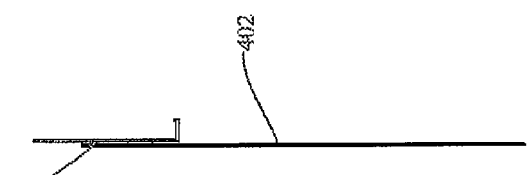
FIG. 9B is a side view of the gable bracket mechanism of FIG. 9A.
Figure 9C:
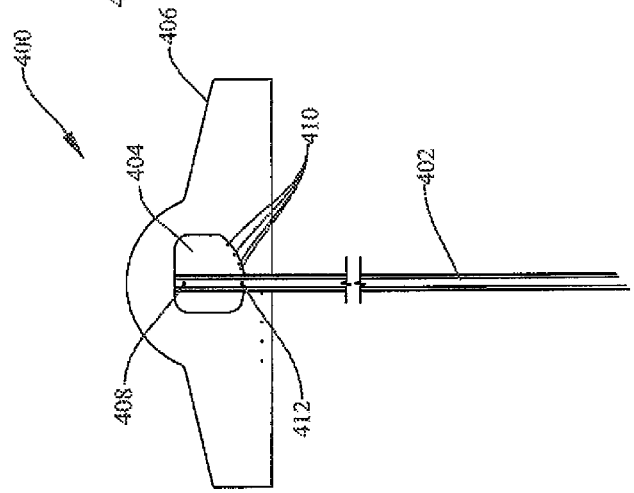
FIG. 9C is a rear view of the gable bracket mechanism of FIG. 9A.
Figure 9D:
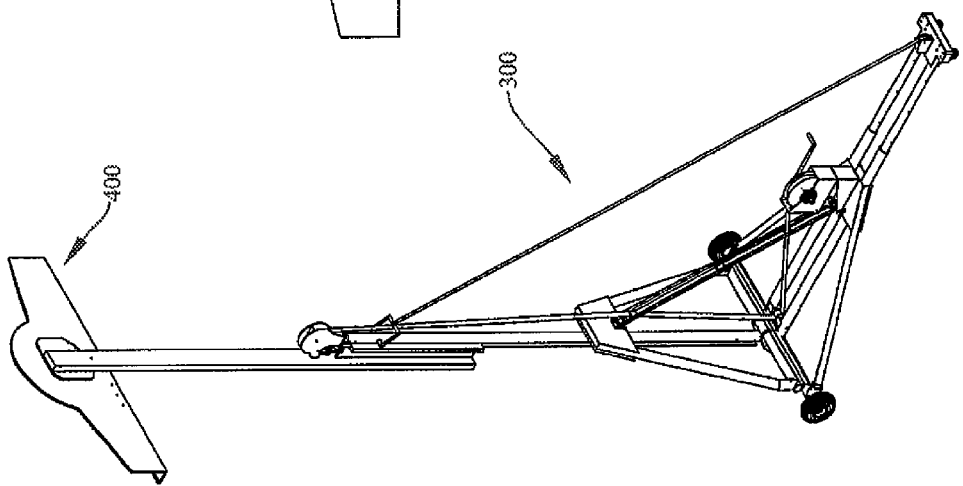
FIG. 9D is a rear perspective view of the lift assist device with the gable bracket mechanism.

Referring to FIGS. 4A-5, the lift component 204 has a guide body 230 and a utility tray 232 for carrying or stabilizing weight such as the construction load. The utility tray 232 extends outwardly from the guide body 230 and has a lip 234 extending upwardly along a front edge of the utility tray 232 to further stabilize the weight when lifted. The guide body 230 provides side support of the construction load on a front side and has a sleeve 236 with a channel 238 on a back side. The channel 238 is sized and configured to receive the guide track 206 therein. Thus, the sleeve 236 is slidable along the guide track 206 to guide the lift component 204 up the base bar 202. The sleeve 236 and guide track 206 further provide safety to the sole home builder to prevent the construction load from falling, twisting, or moving laterally as the weight is raised, thereby positioning the load in a desired location. The guide body 230 has a lifting lug 240 attached at the top of the guide body 230 for connection with an end of the cable. The lift component 204 further includes a lock mechanism 242 to lock the lift component 204 at a desired point on the guide track 206. The lock mechanism 242 includes a lever 244, a swivel key 245, and a bias member 246. The lever 244 has a first end portion that mates with the swivel key 245 and a second end portion, about which the lever 244 rotates via a pin attached to the lift component 204. The second end portion is generically rounded and has a cam portion or locking cam 247 adjacent the channel 238. The cam portion 247 is positioned on the second end portion so as to dig into the guide track 206 to prevent the lift component 204 from sliding downward along the guide track 206, but allow upward movement of the lift component 204. The bias member 246 includes a spring to bias the lever 244 downward, thereby pushing the cam portion 247 into the guide track 206. For lowering the lift component 204, the lever 244 is rotated upward to compress the bias member 246 and the swivel key 245 is rotated to engage the lever 244 such that the compression of the bias member 246 is maintained. When the swivel key 245 engages the lever 244, the cam portion 247 is rotated away from the guide track 206, thereby allowing downward movement of the lift component 204.

Lift Assist Device

Referring to FIGS. 3A and 5-7, a lift assist device 300 provides assistance to the sole home builder in lifting heavy construction loads by himself. The lift assist device 300 advantageously provides the sole home builder with a foldable device for easier storage and a device for aiding with construction of such heavy construction loads as a pre-constructed wall or truss. The lift assist device 300 is also easily maneuverable such that the sole home builder can maneuver the lift assist device 300 where needed on a home construction site.

The lift assist device 300 includes a folding unit 302, a main lateral frame 304, and a counter weight section 306 and a ratchet assembly 308. The folding unit 302 folds for easy storage and unfolds to mate with the lift assist assembly 200. The folding unit 302 includes a lower support component 310, an upper support component 312 and a brace member 314. The lower support component 310 and the upper support component 312 are connected together by a hinge 316 and connected via the brace member 314. The lower support component 310 connects with the main lateral frame 304. The lower and upper components 310, 312 are each approximately triangular shaped and have two lateral bars 318, 320, 322, 324 and one base bar 326, 328 with the base bar 326, 328 of each triangle being connected by the hinge 316. The lower support component 310 has a wheel 330, 332 disposed on each end adjacent the upper support component 312. The upper component 312 has a sleeve 334 for receiving the base bar 202 of the lift assist assembly 200.

The main lateral frame 304 serves as the backbone for the lift assist device 300 and supports the ratchet assembly 308 thereon. The main lateral frame 304 includes two substantially parallel bars 338, 340 that connect the folding unit 302 to the counterweight section 306. The main lateral frame 304 connects to the folding unit 302 via the lateral bars 318, 320 of the lower support component 310 connecting to respective lateral bars 338, 340 of the main lateral frame 304. The parallel bars 338, 340 are preferably extendable and can have a brace therebetween. The cable passes around the swivel 344, causing the swivel 344 to rotate about a pin as the winch pulls the cable. The swivel 344 therefore guides the cable and limits friction.

The counterweight section 306 and ratchet assembly 308 have a plurality of casters 344 underneath. The counterweight section 306 further includes a hand winch 348 for folding and unfolding the folding unit 302.

The brace member 314 includes a hinge 350 in a center portion. The brace member 314 is sized and configured to support the upper support component 312 when vertical and further configured and arranged to fold when folding unit 302 is folded via the hinge 316. The brace member 314 is connected at a top portion of the upper support component 312 at one end and connected to the main lateral frame 304 at the other end.

Referring to FIGS. 5-8C, the ratchet assembly 308 includes a base assembly 352 and a winch assembly 354 on the base assembly 352. The base assembly 352 is disposed on the main lateral frame 304 between the folding unit 302 and the counterweight section 306. The base assembly 352 includes a first portion 356 and a second portion 358. The first portion 356 is connected to the second portion 358 by a hinge 360. The first portion 356 rotates about the hinge 360. The second portion 358 of the base assembly 352 includes an angled surface 362 that slopes downwardly toward the folding unit 302. The base assembly 352 further includes a support arm 364. The support arm 364 supports the first portion 356 above the angled surface 362. The support arm 364 can be rotated away to allow the first portion 356 with the winch assembly 354 to rotate about the hinge 360.

Referring now to the winch assembly 354, the winch assembly 354 includes a removable handle 366, a strap drum 368, a cog wheel 370 attached to one side of the strap drum 368 and a locking assembly 372. The removable handle 366 inserts into a handle shaft 373 on either side of the winch assembly 354 for operation of the winch assembly 354 from either side of the lift assist device 300. The cog wheel 370 has substantially symmetrically shaped teeth positioned in a circle with a diameter smaller than the strap drum 368. The lock assembly 372 engages the cog wheel 370 to prevent rotation of the strap drum 368 in a certain direction. Specifically, the locking assembly 372 has a symmetrically shaped dowel 374 that is inserted between the teeth of the cog wheel 370 to lock the strap drum in place. The dowel 374 is spring biased and can be pulled away from the cog wheel 370 via an actuator knob 376.

Gable Bracket Mechanism

Referring to FIGS. 9A-9D, a gable bracket mechanism 400 is provided to assist the sole home builder with installing the gable. Specifically, the gable bracket mechanism 400 is designed to hold and lift the gable as it is raised into position using the lift assist device 300. The gable bracket mechanism 400 includes a mounting channel 402, a first member 404 and a second member 406. The mounting channel 402 is a rigid member, preferably made of a high strength metal or alloy such as steel.

The first member 404 and the second member 406 are pivotally attached to the mounting channel 402 at a pivot point 408. The first member 404 includes a plurality of pivot holes 410 positioned along an edge of the first member 404. The first member 404 provides the user with the option of rotating and securing the first member 404 and second member 406 in an angled position. A locking pin 412 is inserted through the mounting channel 402 and through the desired pivot holes 410 to angle the first member 404 and the second member 406 at a desired angle.

The second member 406 is attached to the first member 404 on a side opposite the side with the mounting channel 402. Thus, the first member 404 is sandwiched by the mounting channel 402 and the second member 406. The second member 406 is larger than the first member 404 with an arched top portion and is sized, configured and arranged to hold and carry a gable as it is raised into position. The second member 406 has a gable tray 414 extending outwardly at a bottom edge of the second member 406. The gable tray 414 is configured and arranged to hold a gable. The gable bracket mechanism 400 is configured for use with the lift assist device 300 and is designed to be an alternative to the lift component 204. Specifically the mounting channel 402 is designed to receive the guide track 206 of the lift assembly 200.

Safety Railing Assembly

Figure 10C:
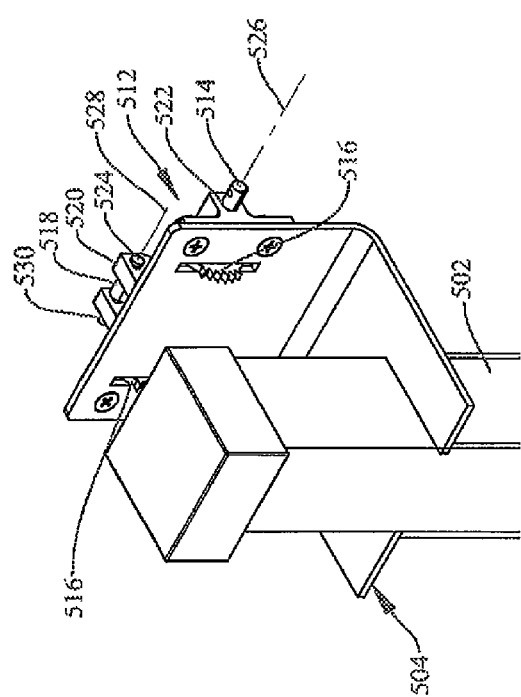
FIG. 10C is a rear perspective, magnified view of a mount of the safety railing assembly.

Referring to FIGS. 10A-10D, a safety railing assembly 500 includes a vertical rail post 502 and first and second railing mounts 504, 506 disposed on the vertical rail post 502. The assembly 500 further includes a detachable guard rail 508. The mounts 504, 506 are sized and configured to hold boards, which constitute railings 510. A plurality of the safety railing assemblies 500 are preferably installed with railings 510 linking the assemblies 500 as seen in FIG. 10A.

Figure 10D:
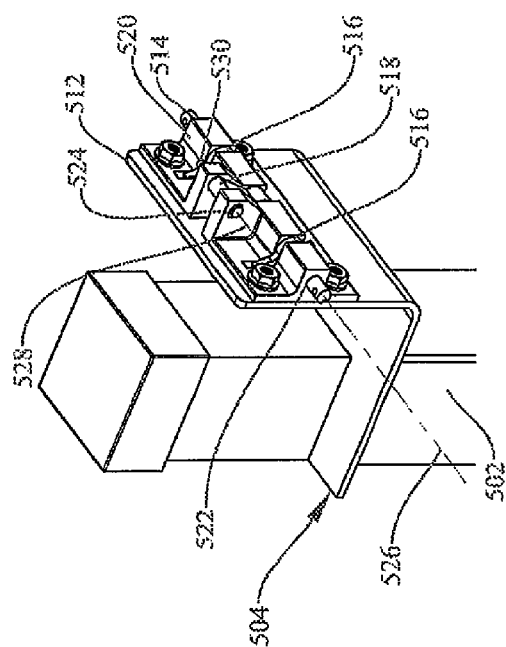
FIG. 10D is a front perspective, magnified view of the mount of the safety railing assembly.

Referring to the mounts 504, 506, as best seen in FIGS. 10B-10D, each of the mounts 504, 506 includes a rail retainer assembly 512 that immovably secures the railing 510 to the mount 504, 506. The rail retainer assembly 512 includes a shaft member 514, cog members 516, a lock lever 518 and a block member 520. The cog members 516 and the lock lever 518 are fixed to the shaft member 514 with the lock lever 518 being disposed between the cog members 516. The block member 520 has various protrusions with apertures therethrough which form first and second openings 522, 524 to receive shafts along a first axis 526 and a second axis 528, respectively. The shaft member 514 is rotatably disposed in the first opening 522 and rotates about the first axis 526. When a railing 510 is inserted against the vertical rail post 502, the shaft member 514 is rotated to bring the cog wheels 516 and the lock lever 518 towards the railing 510. The cog wheels 516 slide through slots in the mounts 504, 506 and the block member 520 to engage the railing 510 with a plurality of cog teeth. When the cog wheels 516 are sufficiently engaged with the railing 510, the lock lever 518, having an aperture at an end opposite the shaft member 514, receives a locking pin 530 disposed along the second axis 528 through the protrusions forming the second opening 524.

Referring to FIGS. 11A-11D, the safety railing assembly 500 further includes a base assembly 532 that is used to secure the safety railing assembly 500 to a roof. The base assembly 532 has a flat surface for lying flush with a portion of an unfinished roof. The base assembly 532 includes a receiving post 534 for receiving the rail post 502 and a receiving portion 536 that is generally flat and extends outwardly from sides of the base assembly 532. The detachable guard rail 508 has hooks extending from the bottom that insert into holes in the receiving portion 536 of the base assembly 532.

The base assembly 532 further includes a close-fitting cavity 538, a cam apparatus 540 in the cavity 538, a crimper 544 and a handle 546. The handle 546 is nonrotatably fixed to the cam apparatus 540 and rotatable with respect to the base assembly 532. The crimper 544 is used to crimp a thin sheet of metal 548 such as a strip of tin. The thin sheet of metal 548 is nailed to the unfinished roof and the cam apparatus 540 is rotated to crimp the sheet of metal 548 via the crimper 544.

Referring to FIGS. 10B and 11A-11C, the close-fitting cavity 538 allows the cam apparatus 540 to rotate therein. The cam apparatus 540 has a slot 550 for receiving the sheet of metal 548 and a locking notch 552 near the slot 550. A free end of the thin sheet of metal 548, which has an end nailed to the unfinished roof, is inserted between the crimper 544 and the cam apparatus 540 and then inserted into the slot 550.

The handle 546 is fixed to the cam apparatus 540 so as to drive the locking notch 552 to the location of a locking block 554 protruding into the cavity 538 when the handle 546 is in a retracted position. The locking notch 552 is sized and configured to receive the locking block 554. In other words, the cam apparatus 540 is locked via the locking notch 552 and the locking block 554 when the handle 546 is in the retracted position. During rotation of the handle 546, the handle 546 not only rotates the cam apparatus 540 but also moves the cam apparatus 540 in an arc motion. Referring to FIGS. 11A-11C, the base assembly 532 includes side plates 556 having an arc guide slot 558. The portions of the handle 546 on either side of the base assembly 532 that connect to the cam apparatus 540 extends through the side plates 556 via the guide slot 558. The guide slot 558 guides the handle 546 as it is rotated in an arc motion thereby causing the cam apparatus 540 to move in an arc motion.

The base assembly 532 has a pitch adjust unit 560 having pitch adjust openings 562 and pins 564 to adjust a pitch with respect to the fascia board or roof. In operation, the handle 546 rotates the cam apparatus 540 downwardly and locks in place for safety. The handle 546 is sized and configured to rotate about and over the receiving post 534 when the vertical rail post 502 is not installed. The cam apparatus 540 uses the leverage of the thin sheet metal 548 nailed to the roof to secure the safety railing assembly 500 at the edge of the roof, for the safety of the sole home builder, whether on top of the roof or on bottom.

Wall Stop

FIGS. 12A-12D illustrate a wall stop 600 that is provided to stop or catch a wall as it is installed on an upper floor or level by the sole home builder. The wall stop 600 is preferably nailed to an exterior side of a rim joist, sub floor or floor box. Specifically, the wall stop 600 includes a mount plate 602 and a backing structure 604. The mount plate 602 has a mounting body 606 with apertures 608 for driving nails therethrough and a platform portion 610 extending at an angle from the mounting body 606. The backing structure 604 is attached to the platform portion 610 at a location away from the angle between the mounting body 606 and the platform portion 610 to form a gap section 612 in which the wall rests on the platform portion 610. When the sole home builder installs a wall on an upper floor, the platform portion 610, disposed on the exterior side of the sub floor, rests under the wall. The backing structure 604 rests on the exterior of the wall and stops the wall such that it is substantially aligned with the exterior face of the sub floor. In addition to the alignment feature, the wall stop 600 catches the wall and prevents it from falling off of the upper floor.

Wall Lift

Referring to FIGS. 13A and 13B, a wall lift 700 is provided to help the sole home builder lift a pre-constructed wall or truss off the floor without injury. The wall lift 700 includes a lever member 702 and a fulcrum member 704 disposed on a base 706. The lever member 702 includes a first pivot portion 708 and a second pivot portion 710. The lever member 702 pivots about a pivot point at the fulcrum member 704 and at the second pivot portion 710. At an end of the first pivot portion 708 is a pivot bracket 712 that is linked to a lift tray 714 via a link strap 716. The pivot bracket 712 is further linked to a support bar 718 similar to the base bar 202. Specifically, the pivot bracket 712 has a channel that receives a track on the base bar 202. The first pivot portion 708 pivots about the pivot bracket 712. In operation, the proximal end 720 of the lever member 702 is pushed down to cause the lever member 702 to pivot about the fulcrum member 704 and cause the lever member 702 to pivot with respect to the pivot bracket 712. The pivot bracket 712 rises along the track of the support bar 718, thereby lifting the lift tray 714. At the proximal end 720 of the lever member 702, locking dowels 722 are disposed which are used to lock the proximal end 720 to the base 706 via a lock mechanism configuration 724 on the base 706.

Corner Draw Breaker Bar

Referring to FIGS. 14A-14C, a corner draw breaker bar 800 is illustrated. The corner draw breaker bar 800 is designed to aid the sole home builder in bringing walls together that form a corner. Specifically, with the use of the corner draw breaker bar 800, the sole home builder can ensure that two walls forming a corner are flush against a corner stud. The corner draw breaker bar 800 includes a first side portion 802, second side portion 804, a body portion 806, a handle portion 808, a draw strap channel 810, a draw strap slot 812, a distal end 814 and a proximal end 816. A draw strap 818 made of a thin piece of metal, for example, is preferably secured to the corner stud via nails or screws, for example, at one end. The other end of the draw strap 818 is threaded through the draw strap channel 810, which runs through the body portion 806, by entering on the first side portion 802 and exiting on the second side portion 804 of the corner draw breaker bar 800. The other end of the draw strap 818 is then loaded into the draw strap slot 812 located at the proximal end 816 and on the second side portion 804 of the corner draw breaker bar 800.

Once the draw strap 818 is secured to the corner stud, entered through the draw strap channel 810 and secured in the draw strap slot 812, the wall can be moved toward the corner stud. In operation, the sole home builder grasps the handle portion 808 and moves the distal end 814 away from the corner stud. This forces the first side portion 802 of the body portion 806 against the wall and causes the proximal end 816 to rotate along a surface of the wall. As the distal end 814 moves away from the corner stud, the wall becomes flush with the corner stud. The corner draw breaker bar 800 is advantageous because it ensures that not only is the wall flush against a face of the corner stud, but, with the aid of the draw strap 818, it also aligns the face of the wall with a face of the corner stud perpendicular to the face flush with the wall. The corner draw breaker bar 800 can be used at any location on the end portion of the wall from top to bottom, but preferably is used at the very top and very bottom of the wall's end portion.

Cart

Referring to FIGS. 15A-15E, a cart 900 with a pivotable wall tray 902 is provided to assist the sole home builder with moving heavy loads about the home construction site. The cart 900 includes a base body 904 that supports the pivotable wall tray 902. The base body 904 further has a return mechanism 906 disposed at the base body 904. The return mechanism 906 includes a foot pedal 908 disposed at a side of the base body 904 and a locking bar 910 underneath the base body 904. The foot pedal 908 is spring loaded and engages the locking bar 910. Specifically, the locking bar has a latch mechanism 912 that is utilized to lock the pivotable wall tray 902 in a desired position. The pivotable wall tray 902 is pivotably attached to the base body 904 and pivots about a pivot point at a center portion of the base body 904. The pivotable wall tray 902 pivots toward a wall stop portion 914, disposed on an end of the base body 904, in order to grasp a wall or other structure between the pivotable wall tray 902 and the wall stop portion 914. The pivotable wall tray 902 pivots toward the wall stop portion 914 when weight is set onto a bottom platform tray of the pivotable wall tray 902. The base body 904 has four wheels at corners of the base body 904. The base body 904 can include two casters 916 and two fixed direction wheels 918, for example.

Referring to FIG. 16, an adapter 920 is provided to facilitate carrying fragile structures or oversized structures. The adapter 920 includes opposing walls 922 extending upwardly and having a height larger than the pivotable wall tray 902 or wall stop portion 914. The opposing walls 922 preferably have a soft outer layer made of foam, for example, and a stiff inner core, made of a lightweight alloy, such as an aluminum alloy. At a top end portion of the opposing walls 922, each opposing wall 922 preferably has an additional soft outer layer made of foam. The additional soft outer layer is utilized as padding to prevent damage to the structure as it rests at the top end portion of the opposing wall 922.

Wall Splice Base Clamp

Referring now to FIG. 17A-17G, a wall splice base clamp 1000 is used to bring two wall sections together so that they are flush with a post or stud. The clamp 1000 has a handle portion 1002 and a clamp portion 1004 attached to the handle portion 1002. The clamp portion 1004 is configured to encompass the post and opposing ends of two wall sections. The clamp portion 1004 includes a first section 1006 and a second section 1008. The first and second sections 1006, 1008 are slidably coupled so as to move towards and away from each other so as to decrease or increase the space therebetween. The handle portion 1002 is pivotably attached to the clamp portion 1004 at a pivot portion 1010 of the handle portion 1002. Specifically, the pivot portion 1010 is pivotably attached to the first section 1006 via a pin 1012. The handle portion 1002 includes an actuator portion 1014 that engages an actuator pin 1016 on the second section 1008. The actuator portion 1014 includes a slot 1115 that receives the actuator pin 1016. As the handle portion 1002 is turned, the handle portion 1002 pivots about the pin 1012 on the first section 1006, which causes the actuator portion 1014 to engage the actuator pin 1016, and the second section 1008 is then slid toward the first section 1006. The inwardly sliding action of the first and second sections 1006, 1008 causes the walls to move toward the post and become flush against the post.

In understanding the scope of the present invention, the term "comprising" and its derivatives, as used herein, are intended to be open ended terms that specify the presence of the stated features, elements, components, groups, and/or steps, but do not exclude the presence of other unstated features, elements, components, groups, and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least 5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims.

What is claimed is:

1. A mobile lift assist assembly adapted to permit a sole individual at a construction site to stabilize, move, lift and position construction loads where needed at the construction site that are otherwise too heavy for a sole individual to handle, the lift assist assembly comprising:

a lifting component including a guide body, the guide body having a front side, a back side, and a sleeve operatively connected to the back side thereof, the sleeve further having a channel formed therein;

a base bar having a preselected diameter, the base bar including a connecting end portion and a receiving end portion opposite the connecting end portion, the receiving end portion having a receiving face formed thereon, the connecting end portion extending from the base bar and having a diameter smaller than the diameter of the base bar, the different diameters of the base bar and the connecting end portion cooperating with one another to form a connecting face extending therebetween at the location where the connecting end portion extends from the base bar;

a guide track disposed on the base bar and configured to be slidably received in the sleeve and channel operatively connected to the back side of the guide body of the lifting component and, the guide track including a spacer and a guide panel disposed on the spacer, the spacer being connected to the base bar and linking the guide panel thereto;

a folding unit including an upper support member operatively connected to the lifting component and a lower support member hinged to the upper support member, whereby the mobile lift assist assembly may be folded for storage;

a main lateral frame adapted to support the lift assist assembly component and base bar, the main lateral frame being operatively connected to the lower support member of the folding unit and including at least one extendable bar having a counterweight secured thereto forming a counterweight section adapted to counterbalance a construction load positioned on the lifting component;

a winch assembly mounted on the main lateral frame;

a pulley bar including a connecting end portion configured to connect to the base bar at the receiving end portion;

one or more pulleys disposed on the pulley bar;

a cable extending through the one or more pulleys and being operatively connected at a first end thereof to the lifting component and at a second end thereof to the winch assembly; and a plurality of casters positioned underneath the counterweight section and operatively connected thereto, whereby the lift assist assembly may be moved to a selected location on the construction site.

2. The lift assist assembly of claim 1, further comprising a plurality of extension bars configured to be connected between the base bar and the pulley bar.

3. The lift assembly of claim 1, wherein the lift component includes a lifting lug at a top portion of the guide body.

4. The lift assist assembly of claim 1, wherein the lift component includes a lock mechanism to lock the guide body at a desired point on the guide track.

5. The lift assist assembly of claim 4, wherein the lock mechanism is spring loaded.

6. The lift assist assembly of claim 1 wherein the connecting face slopes down and away from the guide track and the receiving face slopes upwardly toward the guide track, the connecting face and the receiving face being structured and arranged to have complementary orientations whereby the base bar, the pulley bar and the guide track are connected and aligned properly.

7. The lift assist assembly of claim 6, further comprising at least one extension bar configured to be connected between the base bar and the pulley bar, each of the at least one extension bars being of a preselected size and including a connecting end portion and a receiving end portion opposite the connecting end portion, the connecting end portion being connected directly to the extension bar and extending therefrom, each connecting end portion being of a smaller size that the extension bar and wherein the receiving end portion includes an aperture formed therein, the aperture being structured and arranged to receive the connecting end portion of the pulley bar or the connecting end portion of another of the at least one extension bars.

8. The lift assist assembly of claim 7 wherein each of the extension bars further includes a guide track disposed thereon and configured to be slidably received in the sleeve and channel operatively connected to the back side of the guide body of the lifting component and, the guide track including a spacer and a guide panel disposed on the spacer, the spacer being connected to the base bar and linking the guide panel thereto.

9. The lift assist assembly of claim 8 wherein the receiving end portion of each of the at least one of the extension bars includes a receiving face sloping upwardly toward the guide track and wherein the connecting end portion of each of the at least one of the extension bars included a connecting face sloping down and away from the guide track, the connecting face and the receiving face being structured and arranged to have complementary orientations whereby the connecting face of each of the at least one extension bar is adapted to abut the receiving face of either the adjacent base bar or another extension bar and the receiving face of each of the at least one extension bars is adapted to abut the connection face of either the pulley bar or another extension bar, the respective abutting connecting and receiving faces cooperating with one another to ensure that the base bar, each of the at least one extension bars, the pulley bar and the guide tracks are connected and aligned properly.

10. The lift assist assembly of claim 1 wherein the lifting component includes a utility tray extending outwardly from the guide body, the utility tray being structured and arranged to stabilize or carry a construction load.

11. The lift assist assembly of claim 10, wherein the utility tray includes a lip portion that extends upwardly along a front edge of the utility tray.

12. The lift assist assembly of claim 1 further including a brace member having a first end portion adapted to be connected to the upper support member of the folding unit, a second end portion adapted to be connected to the main lateral frame, and a hinged center portion structured and arranged to fold in response to folding the folding unit.

13. The lift assist assembly of claim 1 wherein the main lateral frame further includes a second extendable bar positioned parallel to the at least one extendable bar, the second extendable bar being operatively connected at a first end to the lower support member of the folding unit and a second end secured to the counterweight.

* * * * *